June 20, 1961     K. H. STEIGERWALD     2,989,614
METHOD AND DEVICE FOR WORKING MATERIALS BY
MEANS OF A BEAM OF CHARGED PARTICLES
Filed Nov. 18, 1958     3 Sheets-Sheet 1

United States Patent Office 2,989,614
Patented June 20, 1961

2,989,614
METHOD AND DEVICE FOR WORKING MATERIALS BY MEANS OF A BEAM OF CHARGED PARTICLES
Karl Heinz Steigerwald, Heidenheim, Germany, assignor to Carl Zeiss, Heidenheim (Brenz), Wurttemberg, Germany
Filed Nov. 18, 1958, Ser. No. 774,745
Claims priority, application Germany Nov. 20, 1957
10 Claims. (Cl. 219—50)

This invention relates to methods and apparatus for the working of materials and, more particularly for drilling holes in various materials, by means of a beam of charged particles, sometimes referred to as an electron beam.

The invention constitutes improvements in the methods and apparatus disclosed in my prior U.S. Patent No. 2,793,281, dated May 21, 1957.

It is an object of the present invention to improve the control of the application of energy to the work through the beam of charged particles, in order to improve thereby the accuracy of the work done.

In the working of materials by means of a beam of charged particles, as for instance in the drilling of holes as described in my prior Patent No. 2,793,281, the area of the material which is worked upon is greatly heated by the bombardment of the charged particles so that the material is vaporized at the bombarded area, or is torn off in the form of greater or smaller droplets by the explosion of vapor bubbles.

In order to attain an intensity of vaporization useful for practical purposes, i.e. in order to attain sufficient speed of drilling in the case described, a high density of energy must be present in the beam of charged particles where it impinges upon the material. Normally the beam of charged particles is so focused for this purpose that it gives off its energy uniformly over the entire working area. The energy distribution over the cross-section of the working area should therein be as nearly uniform as possible, and should drop steeply to zero at the borders of the working area from the high level required for the working area.

It is known in the prior art to burn holes of desired shape in extremely thin foil by means of a moving beam of charged particles. Similarly it is known in the prior art to drill holes in relatively thick materials by means of a suitably focused beam of charged particles in which the shape of the hole corresponds essentially to the shape of the beam. Such methods have the disadvantage that due to the continuous application of energy, the temperature at the borders of the worked area do not drop steeply to zero. Due to the conductivity of the material, a constant heat flow takes place from the worked and greatly heated area towards the marginal zones not heated directly by the beam. These marginal zones are finally melted so that a hole cannot be drilled with the required precision.

In order to avoid melting of the marginal zones of the worked area and to avoid other disadvantages occurring in drilling with a continuously impinging beam of charged particles, it has been proposed to control the beam so as to make it intermittent. As long as the working of materials is performed within relatively small dimensions, an intermittently controlled beam of charged particles will produce a satisfactory working effect. If it is, however, desired to produce larger holes possibly with more complicated cross-sectional shapes with a beam of charged particles, then it is difficult to attain a suitable intensity distribution over the entire area to be worked. In order to attain a sufficient working effect one is forced to supply a certain minimum energy to every point of the worked area of the material. Through heat conduction, heat will flow from every point of this area towards the surrounding zones of the material. As the size of the area to be worked upon increases, there results an ever-increasing region of thermally stressed material around the worked area. This means that undesirably large layers at the edge of and below the worked area are melted. Thereby the losses are increased and the desired working effect is disturbed.

The said disadvantages may be avoided according to the present invention by using a beam of charged particles, the working cross section on which is smaller than the worked area of the material, and by directing the said beam so that it moves in predetermined pattern over said worked area of the material in such a way that the entire area is worked by combining a large number of small area elements worked successively by successive impulses of the intermittent beam. A further significant improvement results from controlling the beam in such a way that area elements worked in immediate succession are separated by a distance which is greater than the diameter of the element and outside which the beam does not act or acts only very little upon the material. In this manner it is possible to bombard at every moment one part of the cross section to be worked upon with a beam of very high energy density, while the entire energy applied to said worked area at any moment does not exceed the permissible amount. Furthermore it becomes possible in this way to control the applied energy to compensate for the possibly different conditions at different places of the area to be worked. It is advantageous to make the distances between area elements worked in immediate succession as large as possible. According to the present invention the thermally stressed region of the material is minimized at the borders of the worked area so that very small working tolerances can be observed. Similarly it is possible to produce in practice various cross-sectional shapes however complicated.

Generally it is satisfactory to use a beam of charged particles, the working cross-section of which is circular. In some cases it may, however, be advantageous to use a beam the working cross-section of which is square, rectangular, triangular or other shape. It is advantageous to switch off the beam of charged particles during the movement from area element to area element. In order to attain therewith as large a working result as possible in as short a time as possible it is advantageous to cause the beam impulses to impinge upon the worked area at minimum time intervals. Ordinarily, this is possible only in limited measure since the thermal stress present at any moment in a large region of the material must not exceed a certain amount. If, however, as described above, impulses following each other in sequence are directed to area elements as distant from each other as possible, then the frequency at which the impulses follow each other can be increased to a maximum value most favorable for the shape of the worked cross-section and the type of material.

It is also possible, and in certain cases advantageous, to use an intermittently controlled beam of charged particles which acts upon each area element with a predetermined number of impulses, and the movement of which from one area element to another is carried out during an interval between successive impulses.

With complicated cross-sectional shapes of the worked area of the material, it may be required to discharge different amounts of energy to different parts of this area. To achieve this aim it is advantageous to regulate both the duration of incidence and the intensity of the beam of charged particles by controlling the duration of the pulses and the amplitude of the pulses of the intermittent beam.

In order to enable the work-effect to be determined precisely not only at relatively shallow depths but also at greater depths of the worked area inside the worked material, it is advantageous to control also the angle at which the beam of charged particles impinges upon the worked area of the material at any given moment. For this purpose it is advantageous to provide two independently controlled deflecting systems arranged one above the other and serving for the deflection of the beam in two directions. Thereby it is possible to tilt the beam either about its point of incidence upon the material or alternatively about a point lying a distance either in front of or behind the point of incidence.

A particularly advantageous device for use in practicing the method of the invention consists in the combination of apparatus for the working of material by means of a beam of charged particles with a device for the digital control of the deflection values for said beam and for control of the determining values for the beam producing system. Such a control device consists, for example, of a program storage device and of suitable decoders which transform signals issuing from the program storage device into suitable controlling impulses for the control of the beam.

The program storage device contains all of the signals necessary for the woking of a definite cross-sectional shape in the form of impulse groups. The impulse groups corresponding to the individual decoders may be arranged in parallel, and may be supplied directly to the decoders. They may, however, also have different distribution and may then be supplied to the corresponding decoders through suitable gates. Therein one separate decoder may be provided for every direction of deflection. In the said decoder the controlling impulses are transformed with the aid of switches, for example, electronic switches, into certain values of voltage or current which are supplied to the individual deflector elements. Such a device for the digital control of deflection values has amongst others the advantage that controlling values may be introduced into the program storage device which take into account the non-linearity of the deflecting system and the retentivity of an electromagnetic deflector system.

It is furthermore advantageous to provide a device for the digital control of the determining data of the beam-producing system, for example, for the control of the pulse duration and of the pulse amplitude. Such a device preferably consists of the aforesaid program storage device and of a separate decoder specially adapted to the particular purpose of such control.

A preferred embodiment of the invention selected for purposes of illustration is shown in the accompanying drawings, in which.

Figure 1:
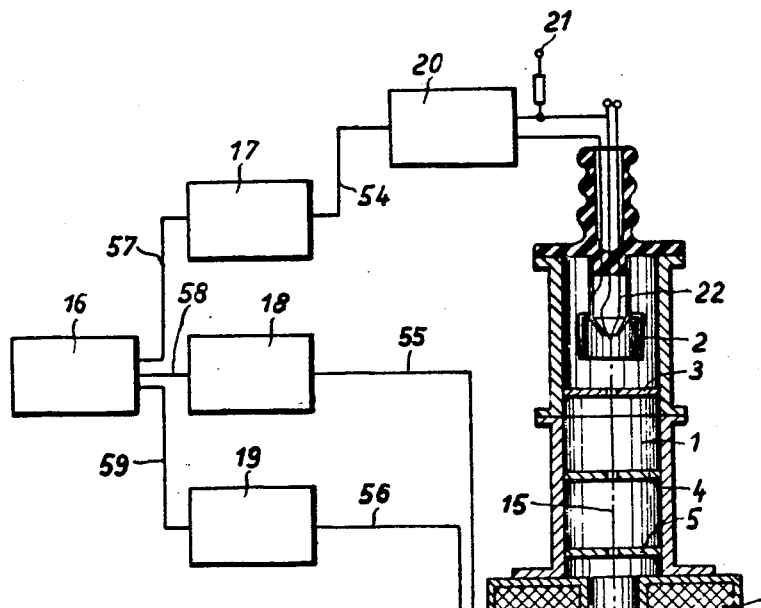
FIGURE 1 is a schematic view, partly in section and partly in diagram, of apparatus embodying the invention.

In FIG. 1 a vacuum vessel is designated by 1 in which a beam-producing system consisting of the cathode 22, the Wehnelt cylinder 2 and the anode 3 is arranged. For the further shaping of the electron beam 15, two diaphragms 3 and 5 are provided, while an electromagnetic lens 6, the poleshoes of which are designated by 7 and 8, serves for focusing the electron beam upon the work piece 10 to be worked. The work piece 10 is ar- ranged in a chamber 13 upon a table 11 which may be shifted upon a further table 12 by means of the spindle 14. The said table 12 can be shifted at right angles to the plane of the drawing by means of a further spindle, not here represented. Reference to my prior Patent No. 2,793,281 may be had for a further description of the construction and operation of such a beam producing system.

Below the electro-magnetic lens 6 a deflecting system 9 is arranged which consists of the four electromagnetic coils 110, 111, 114, and 115. The construction of this deflecting system is clearly visible from FIG. 7. As is shown in this figure the coils 110, 111, and 114, 115 are arranged diametrically opposite each other and contain cores 112, 113, 116 and 117 of permeable material.

The coils are arranged about a non-magnetizable tube 118. The magnetic flux of the coils closes through a ring 119. The space between the ring and the tube 118 is teemed with synthetic resin.

By exciting the coils 110 and 111, which should be connected in series, the electron beam is deflected in the reference plane. By exciting the coils 114 and 115 the electron beam is deflected vertical to the reference plane.

The device illustrated works with electron beam pulses. At 21 a high negative voltage, for example, of −50 kv. is supplied to the cathode 22. The Wehnelt electrode 2 has negative bias relative to the cathode 22 and has a potential of, for example, −50.400 v. Thereby the beam producing system is blocked. If now a positive pulse is supplied to the Wehnelt electrode 2 an electron beam pulse is produced during the duration of this trigger pulse. This pulse impinges upon the work piece 10. For supplying the trigger pulses to the Wehnelt electrode a pulse transformer 20 is provided. This transformer serves to transform the trigger pulses coming in on the low-voltage side to the high voltage which is connected to the Wehnelt electrode.

For controlling the entire system, a program storage device 16 coupled to the decoders 17, 18 and 19 is provided. The program storage device 16 consists, for instance, of a magnetic tape with 24 tracks arranged side by side. On this magnetic tape the entire control program for the production of a hole of definite cross-sectional shape is recorded. For instance the first eight tracks may serve to control the decoder 17, the next eight tracks to control the decoder 18 and the last eight tracks to control the decoder 19.

Figure 2:
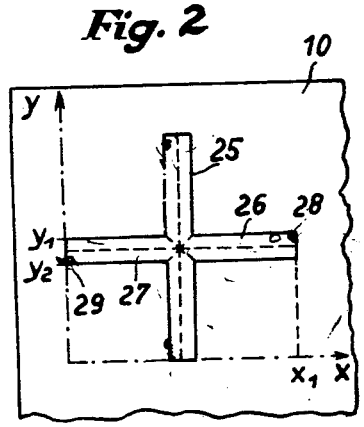
FIGURE 2 is an enlarged plan view of a work area.

In FIG. 2 a cross 25 is shown as an example of an area to be worked. For the purpose of programming, the cross is with advantage subdivided into eight symmetrical sections of which two are designated by 26 and 27. Each of these sections is always programed completely and then the programs for all eight sections are interlaced in such a way that the electron beam pulses impinging in immediate succession are as far removed from each other in space as possible. For example, the first electron beam pulse is aimed to hit the area element 28, and the second the area element 29. Suitable area elements of incidence within the other 6 sections follow. Thereafter the electron beam is aimed upon other areas of the cross 25 determined by programing, so that after running through the entire program this cross is completely composed of sequentially worked area elements after the manner of a mosaic.

For determining a definite point of incidence of an electron beam pulse, definite deflection values are introduced into the program storage device which for the point 28 are designated by coordinates $x_1$, $y_1$ and for the point 29 by coordinates 0, $y_2$. The entire area over which the electron beam is to be deflected is subdivided into individual deflection steps. If, for example, one selects 200 deflection steps both in the $x$ and in the $y$ direction one obtains 40,000 image or working points. If the smallest deflecting current value necessary for the accommodation of 200 deflecting steps in the $x$ or in the $y$ direction, respectively, equals $i$ then each of the two hundred deflecting current values can be obtained by a suitable combination of current values, for instance, according to the dual system. For example the deflecting value $60i$ can be realized by the combination of the values $32i$, $16i$, $8i$, $4i$.

Figure 6:
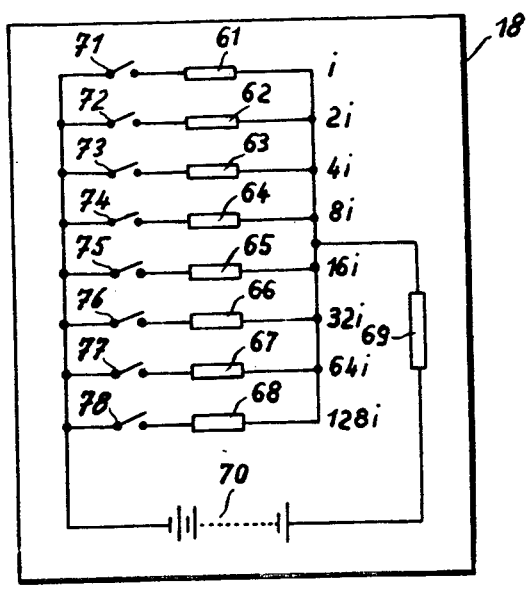
FIGURE 6 is a circuit diagram of a decoder for controlling beam deflection.

The decoder designated by 18 in the block circuit scheme of FIG. 1 is shown in FIG. 6 in purely schematic representation. There are provided eight resistances 61 to 68 connected in parallel and in circuit with a battery 70 with switches 71 to 78 corresponding to every resistance. The resistance values correspond to the dual series 1 to 128. If, for instance, the switch 71 corresponding to the resistance 61 is closed then a current $i$ flows through the resistance 69. The current values corresponding to the individual resistances are indicated in FIG. 6. By closing a suitable combination of switches, any current value from $i$ to $200i$ can be obtained immediately. In this diagram the resistance 69 represents the resistance of two deflector coils serving to deflect the electron beam in one direction, and the switches 71 to 78 are representations of electronic switches. If, for instance, as indicated above the program storage device consists of a magnetic tape with twenty-four tracks of which eight tracks are made to control the decoder 18, then each one of the eight tracks on the magnetic tape controls one of the switches 71 to 78. Thus, if the track controlling the switch 78 contains a magnetic impulse, then the switch 78 is thereby closed and the deflecting current value $128i$ flows through the deflector coils 114 and 115 connected thereto. The statement above is also valid regarding the decoder 19 since the said decoder is constructed in the same manner as the decoder 18. The deflecting coils 110 and 111 are connected to this decoder.

In many cases it is advantageous to arrange the deflector system 9 in two planes instead of in a single plane as shown in FIG. 1. In this way the coils 110, 111 and 114, 115 serving for the deflection of the electron beam in mutually perpendicular directions may be arranged one above the other.

Figure 5:
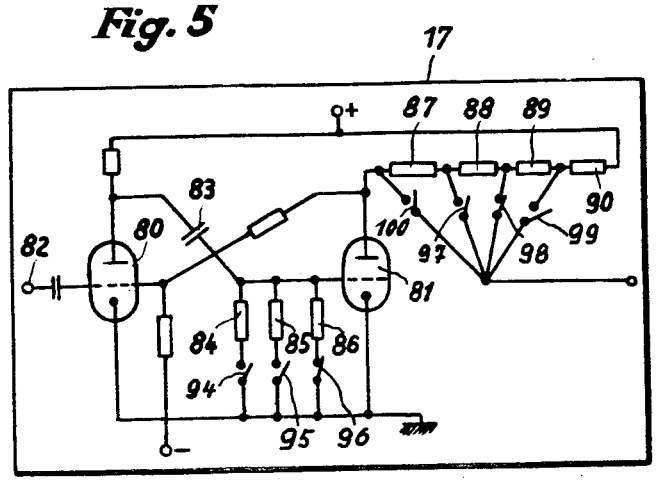
FIGURE 5 is a circuit diagram of a decoder for controlling pulse amplitude and pulse duration.

In FIG. 5 the circuit of the decoder designated by 17 in the block circuit scheme of FIG. 1 is represented. This decoder contains for instance a univibrator constructed from the two electronic valves 80 and 81 and from the corresponding circuit elements in known manner. By the resistances 84, 85 or 86 respectively the pulse duration given by the univibrator can be selected by suitable tappings of the anode resistances 87, 88, 89, 90. The switches 94 to 100 represented in FIG. 5 should again be considered to be electronic switches, each of which is controlled by one track of the magnetic tape of the program storage device 16. In the embodiment represented in FIG. 5 the switches 96 and 98 controlling resistances 86 and 88 have been closed by suitable impulses on the corresponding tracks of the magnetic tape. The univibrator will therefore deliver a pulse of desired duration and desired amplitude as soon as a trigger pulse is supplied via 82. This trigger pulse is recorded on another control track of the magnetic tape.

The operation of the apparatus shown in FIG. 1 is as follows: First the programing of the working procedure is recorded by known procedures upon the magnetic tape of the program storage device 16 based on the conditions determined by the material and by the desired shape of the work area. After completion of the programing procedure, the magnetic tape contains groups of magnetic impulses which are transmitted during the working procedure to the decoders 17, 18 and 19 via the channels 57, 58 and 59. These decoders contain, as explained above, electronic switches which react to signals received from the program storage device 16. The decoder 19 forms the deflection value $i_x$ while the decoder 18 forms the deflection value $i_y$. These deflection values are fed into the coils of the deflector system 9 via the leads 55 and 56 respectively. Simultaneously the pulse amplitude as well as the pulse duration are determined by the decoder 17. After determination of the deflection values as well as the pulse data, a signal is transmitted to the decoder 17 via 57 from the corresponding magnetic track. Thereby the trigger pulse determined in its amplitude and duration is released and applied to the Wehnelt electrode 2 via the lead 54 and the pulse transformer 20. Thereby the electron beam pulse is released which then impinges on that point of the work piece 10 which is determined by the deflector system 9. Thereafter the decoders 17, 18 and 19 may, for instance, be returned to their original positions by suitable impulse signals. Thereupon follows a new setting and triggering process controlled by the program storage device 16 so that the next beam pulse, if required, with altered pulse data impinges upon another point of the work piece. In this way it is possible to work practically any desired shape within the area accessible to the electron beam on the work piece 10.

Figure 3:
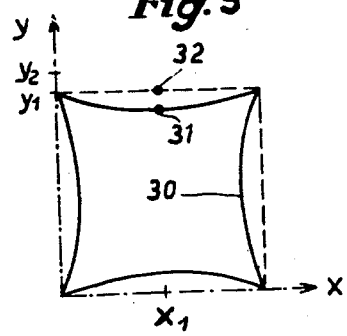
FIGURE 3 is a diagram illustrating one phase of the invention.

The electron-optical deflector systems may not work with sufficient linearity at large angles of deflection and may produce distortions of the desired pattern if controlled by current values having linear relation to the deflection angle. The work area covered by the deflector system under the said conditions is exemplified by 30 in FIG. 3. It may happen, for instance, that after supply of the deflection values $x_1$, $y_1$ in order to hit the point 32, in consequence of the distortion aberration of the deflector system, the point 31 will in fact be hit. With digital control the said error may be avoided by taking into account the nonlinearity of the deflector system and by suitable choice of the values $(x_1, y_2)$. The facility for avoiding errors of the kind described in simple manner represents an essential advantage of the procedure according to the invention.

In the deflection of the beam of charged particles by means of an electro-magnetic deflector system, it must be taken into account that the magnetic material of the deflector coil system possesses a certain retentivity so that the deflecting effect of a definite current supplied to the said deflector system is partly determined by the already present premagnetization of the core material. Difficulties in the proper positioning of the beam of charged particles result therefrom. That is, the said beam does not hit the point of incidence corresponding to a definite value of the deflecting current because of the premagnetization present. According to the present invention the said disadvantage is avoided in that with the use of a deflector system affected by retentivity, deflection signals are fed into the program storage device of the device for the digital control of the deflection values which take into account the premagnetization of the deflector system produced by the immediately preceding deflection current value, either directly or indirectly. This is accomplished by means of an intermediate signal controlling the deflector system so that it has a definite value of retentivity. With knowledge of the hysteresis curve of the magnetic material employed this is possible without difficulty. For example a correction value may be determined for every deflection value which must be added to or subtracted from the subsequent signal in order to take into account the premagnetization present. The device serving for the programing is with advantage constructed in such a way that the said correction values are automatically taken into account in the determination of every deflection signal.

In general, in the deflection of a beam of charged particles over a definite working area, the size of the smallest deflection step will be adjusted according to the geometrical shape of the beam, for instance, according to its diameter. Thus for instance with a beam of charged particles having a diameter of $10\mu$ at the working area, the smallest deflection step should amount to approximately $6\mu$. This means that the deflecting currents must be so subdivided that it becomes possible to reach with multiples of the smallest deflection current unit every point of a rectangular network the separation of the rows of which amounts to 6μ. It may be mentioned here that as previously explained, it is advantageous to make the distances between area elements worked in immediate succession as large as possible. This means that successive deflecting current values are very different from each other. Every individual deflecting current value in itself can be obtained by a suitable combination of current values, for instance, according to the dual system.

If the retentivity of the magnetic material of an electromagnetic deflector system must be taken into account, it is possible that the beam of charged particles, in consequence of the premagnetization present of the core material, will not with a newly supplied signal hit the desired point on the network but for instance hit exactly halfway between two neighboring points on the network. If the said two points on the network are 6μ distant from each other as stated above, then it is not possible to control the beam so as to make it hit the desired point on the network by the supply of further deflection steps. In order to be able to produce sufficiently accurate correction of the positioning of the beam of charged particles it is therefore required to provide smaller deflection steps instead of the deflection steps determined by the geometrical shape of the beam. The smallness of the deflection steps, and therefore of the deflecting current unit, is consequently determined with advantage by the tolerance of position desired. Therein the smallest deflection step is selected according to the diameter of the circle determining the position tolerance of the beam of charged particles. If the said position tolerance is for instance ±1μ then the smallest deflection step should amount to 2μ. Thereby it becomes possible in the example described above in which the beam of charged particles hits at a distance of 3μ from the desired point on the network to control the beam so as to hit within the limit of tolerance of the desired point of the network by the supply of two further deflection steps of 2μ each.

In similar manner it is possible to reduce very greatly the electron-optical errors which also occur in the deflection of the electron beam, by simultaneous control of the electron-optical system, i.e. of the electron beam source of the electro-magnetic lens 6, as well as by suitable inclination of the axis of the electron beam directed upon the lens 6 with respect to the axis of symmetry of the said lens. For this purpose there may be required under certain circumstances further deflector systems and/or electron-optical correction systems such as a so-called stigmator and suitable decoders therefor.

Figure 7:
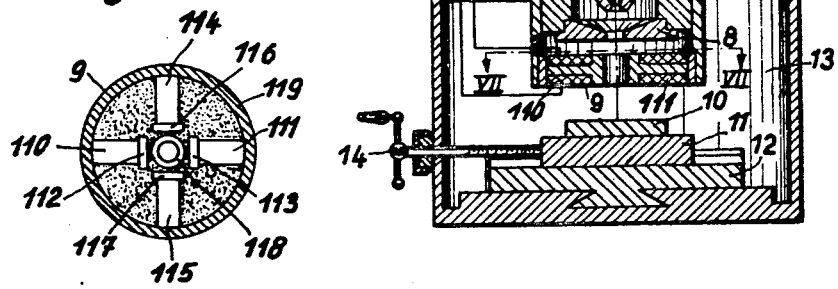
FIGURE 7 is an enlarged view in horizontal section taken on line VII—VII of FIGURE 1 and looking in the direction of the arrows.
Figure 4:
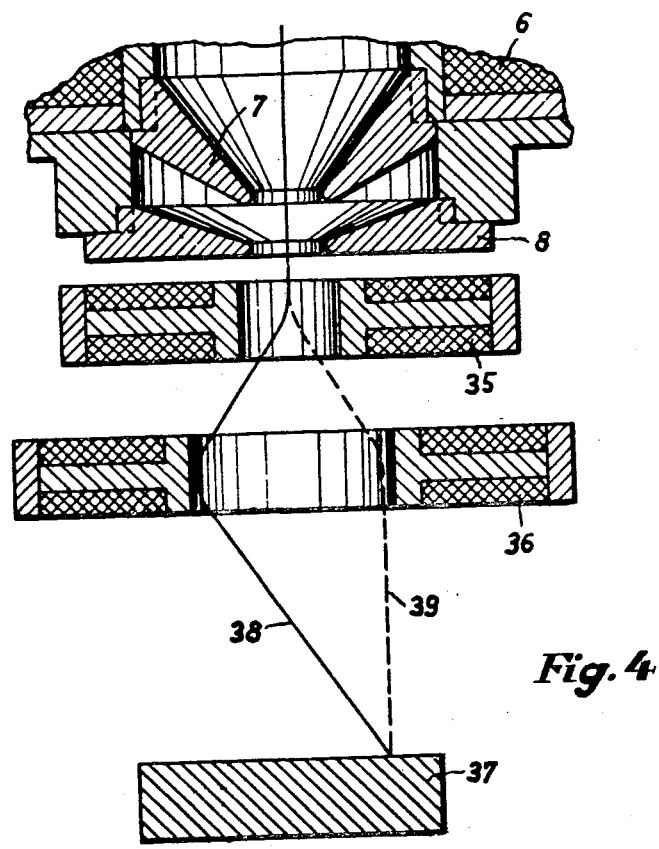
FIGURE 4 is a sectional view showing a modified form of beam deflecting device.

In certain cases it is desired to control, in addition to the area of incidence, also the angle of incidence of the electron beam upon the work piece 10. To attain this aim, it is advantageous to provide a further deflector system in addition to the deflector system 9 represented in FIG. 1. A suitable arrangement is represented in FIG. 4. As can be seen in this figure, two electro-magnetic deflector systems 35 and 36 are arranged below the electro-magnetic lens 6. Each of these deflector systems is constructed like the deflector system 9 (FIG. 7). By means of the deflector systems 35 and 36, the angle of incidence of the electron beam can be altered within wide limits. An example is indicated by the two rays 38 and 39. These two rays are incident upon the same point of the work piece to be worked but at different angles. In the apparatus illustrated in FIG. 4, two further decoders similar to the decoders 18 and 19 are used with advantage to supply the desired deflection current values to the additional deflector system. The deflection currents flowing through the two systems 35 and 36 must at any given moment have a definite relation to each other.

After finishing a working process, as for instance after completing drilling through the work piece 10, the work piece in the device represented in FIG. 1 is shifted by means of the spindle 14. In principle it is possible to carry out this shift also automatically. The signals for this purpose may also be provided on the magnetic tape. In this manner a fully automatic working procedure is attained.

The program storage device 16 may comprise a magnetic drum instead of a magnetic tape. Similarly it is possible to use, instead of a magnetic tape with twenty-four magnetic tracks, a tape with a different number of tracks, or alternatively a tape with one track only. In this latter case the individual impulse groups are recorded one after another and suitable distribution to the various channels must be provided. Apart from the extraordinarily high working accuracy which is attained by the application of the procedure according to the invention, there results also a very high working speed. Thus it is possible to provide beam pulse frequencies of 1 kHz. and more wherein every pulse reaches the worked area in predeterminable manner and at a predeterminable place. As an example, holes of cross shape profile as shown in FIG. 2, of 40μ arm width and 2 mm. total arm length can be drilled in V2A steel of 0.5 mm. thickness in approximately 5 seconds.

I claim as my invention:

1. The method of working a sharply defined area of a surface of material by an impinging beam of charged particles without working of material outside of the defined area by heat transfer through the material which comprises focussing the beam to an impinging cross section having a diameter smaller than the smallest cross sectional dimension of said area, moving said beam in a predetermined pattern over the area to impinge upon successive locations separated by a distance greater than the beam diameter, regulating the beam intensity to work the material at each location and to have little working effect during movement between successive locations, and continuing said movement until the beam impinges on all locations within said area to work the entire area.

2. The method as claimed in claim 1 in which the beam is interrupted during movement from one position to another.

3. The method as claimed in claim 1 in which the intensity and duration of each impingement is regulated.

4. The method as claimed in claim 1 in which the angle which the axis of said beam makes to the plane of the surface is regulated for each impingement.

5. In combination with an electron gun having a cathode for the emission of charged particles, means for accelerating said particles to impinge upon a predetermined area on a target, means for focusing said accelerated particle in a beam having a cross-sectional area small with respect to said predetermined area, and a control electrode normally biased to cut off the particle beam; means responsive to an energizing signal for deflecting said beam to a desired position within said predetermined area; a programmer for the generation of a first, second and third digitally-coded signal; means responsive to said first signal for determining the amplitude and duration of a pulse signal; means responsive to said second signal to apply a desired energizing signal to said deflection means, and means responsive to said third signal to apply said pulse signal to said control electrode to overcome the bias and to form a discharge of said charged particle beam of predetermined intensity and duration which is directed to said predetermined position by said deflection means.

6. In combination with a particle accelerator adapted to focus a stream of charged particles upon a predetermined area on a remote target in a beam of cross-section small with respect to said predetermined area, a first deflector means responsive to a first signal to deflect said focussed beaming at an angle to the axis of the undeflected beam, a second deflection means responsive to a second signal to deflect said focussed beam at an angle to the axis of the undeflected beam, programmer means to generate said first and second signal to cause said beam to impinge respective positions on said target area in a predetermined pattern and at a predetermined angle to the plane of said predetermined area and means to regulate the beam intensity and duration of the beam impingement at each of said deflected positions to work the target material.

7. In a device for working an area of a material, the combination comprising a beam producing system for producing a beam of charged particles, means for focusing said particles in a beam having a cross-sectional area small with respect to said working area, said beam producing system being normally biased to cut off the particle beam, means responsive to an energizing signal for deflecting said beam to a desired position within said working area, a programmer for the generation of a plurality of first and second digitally-coded signals, means responsive to said plurality of first signals for determining and applying a plurality of energizing signals to said deflecting means and means responsive to said plurality of second signals to apply a plurality of pulse signals to said beam-producing system to overcome the bias and to form a discharge of said charged particle beam, whereby a pulse signal is applied to said beam producing system whenever a set of coordinates required to direct said beam of charged particles upon a predetermined position within said working area has been determined by said plurality of first signals, so that the resulting beam pulses generated in this way are moved by steps over said working area thereby composing the whole of said area from worked area elements.

8. The combination in accordance with claim 7 in which each of said worked area elements is separated from the preceding area element by a distance greater than the diameter of said beam.

9. The combination in accordance with claim 7 which includes a second deflection means cooperating with said energizing signal responsive deflecting means to control the angle at which said beam strikes each area element.

10. The combination in accordance with claim 7 which includes means for controlling the beam intensity and duration of impingement on each area element.

References Cited in the file of this patent

UNITED STATES PATENTS

| 2,778,926 | Schneider | Jan. 22, 1957 |
| 2,819,380 | Eaton | Jan. 7, 1958 |
| 2,850,723 | McNancy | Sept. 2, 1958 |
| 2,872,669 | Johnson et al. | Feb. 3, 1959 |
| 2,883,544 | Robinson | Apr. 21, 1959 |
| 2,931,022 | Triest | Mar. 29, 1960 |

FOREIGN PATENTS

| 1,141,535 | France | Mar. 18, 1957 |